United States Patent [19]
Mauthe et al.

[11] 3,806,682
[45] Apr. 23, 1974

[54] HIGH-VOLTAGE GAS-INSULATED SWITCHGEAR WITH CAPACITIVE VOLTAGE DIVIDER FOR INDICATING CONTACT POSITION

[75] Inventors: Gerhard Mauthe, Wettingen; Walter Stolarz, Fislisbach, both of Switzerland

[73] Assignee: Brown Boveri & Company Limited, Baden, Switzerland

[22] Filed: Oct. 3, 1972

[21] Appl. No.: 294,569

[52] U.S. Cl. .......... 200/148 B, 200/163, 200/167 R
[51] Int. Cl. ............................................ H01h 33/60
[58] Field of Search .. 200/163, 148 B, 48 R, 167 R; 324/28 R, 28 CB, 28 CR

[56] References Cited
UNITED STATES PATENTS
3,665,257 5/1972 De Heus ..................... 200/163 X
3,356,798 12/1967 McKinnon ................ 200/148 B X
3,599,041 8/1971 Boersma et al. ............ 200/148 B X FOREIGN PATENTS OR APPLICATIONS
462,925 11/1968 Switzerland ................... 200/148 B Primary Examiner—Robert K. Schaefer
Assistant Examiner—Robert A. Vanderhye
Attorney, Agent, or Firm—Pierce, Scheffler & Parker

[57] ABSTRACT

High-voltage metal-clad gas-insulated switchgear apparatus wherein an isolator switch is mounted in a gas-filled earthed casing to isolate one conductor part of the apparatus from the other, and an earthing switch mounted on the casing includes a movable contact member operable to engage and effect earthing of the isolatable conductor part by connecting the latter to the earthed casing. A measuring electrode mounted within the casing and insulated therefrom forms part of a capacitive voltage divider from which is derived a voltage the magnitude of which indicates whether the contacts of the isolator switch are open or closed.

5 Claims, 2 Drawing Figures

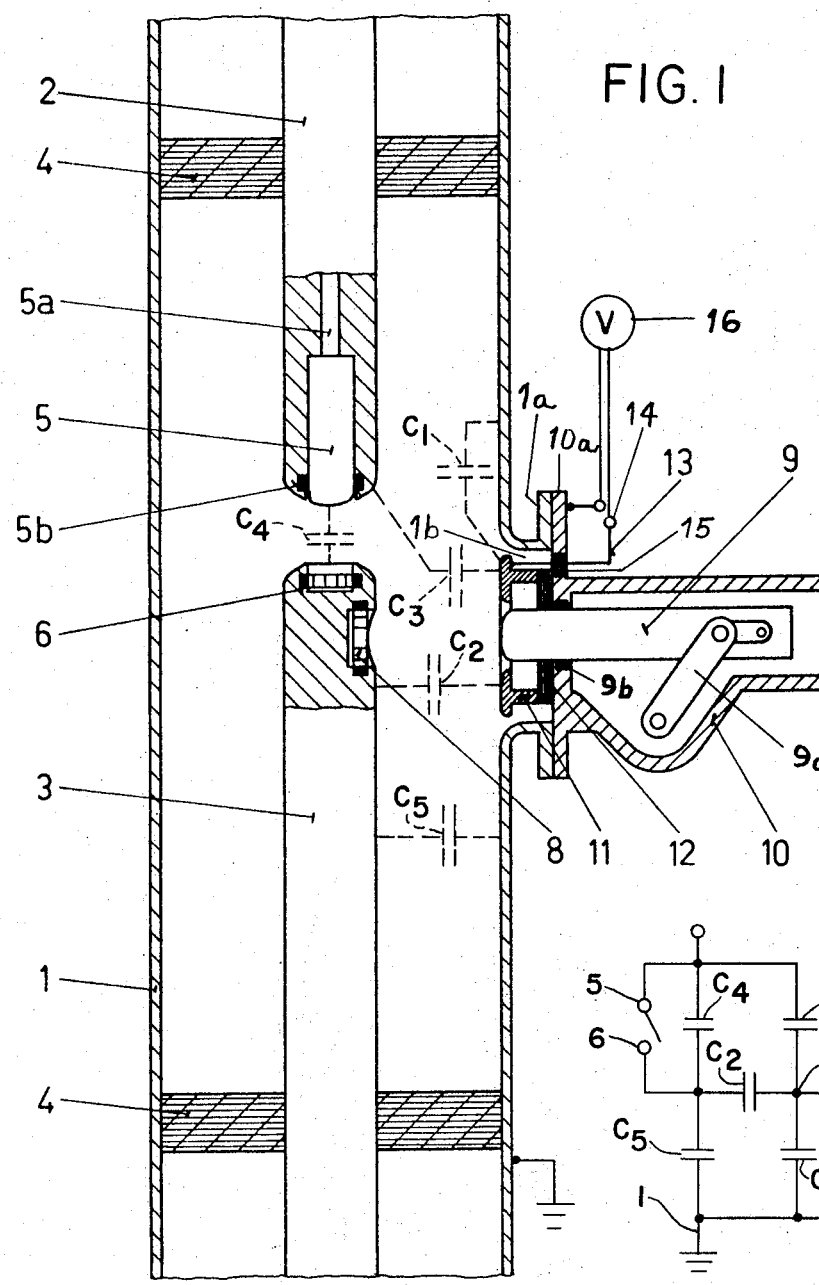

HIGH-VOLTAGE GAS-INSULATED SWITCHGEAR WITH CAPACITIVE VOLTAGE DIVIDER FOR INDICATING CONTACT POSITION

The present invention relates to high-voltage, metal-clad, gas-insulated electrical switchgear apparatus, and which incorporates at least one isolating switch for isolating one part of the switchgear apparatus from another, the isolatable part being adapted to be connected by an earthing switch to the earthed casing of the isolating switch, there being provided a capacitive voltage divider for measuring the voltage of the conductor part with which the isolating switch is associated, thereby enabling one to determine if the contacts of the isolating switch are open or closed.

For visual inspection of the switching point and of the position of the contacts of the isolating switch located within a casing filled with insulating gas under pressure, it is known to provide inspection glasses diametrically opposite one another in the wall structure of the casing. One such visual inspection arrangement is disclosed in German Pat. No. 1,897,048. In addition it is also known to provide at the height of the off-and-on positions of the movable contact member of the isolating switch a photoelectric system consisting of incandescent lamps, lenses and photo-electric cells which can be utilized to telemeter the position of the isolating switch contacts to a remote location. One arrangement for doing this is disclosed in German Pat. No. 1,925,275. Devices of this kind, however, are relatively complicated and subject to breakdown. The sight glass which form the visual inspection windows are undesirable for various reasons since they must be maintained pressure-tight as well as soil-free.

Another mode for determining the position of the contacts of the isolating switch and which is disclosed in Swiss Pat. No. 462,925 is to provide a capacitive voltage divider which serves to measure the voltage condition of the conductor parts associated with the casing-enclosed isolating switch, this voltage divider being connected to a part of three isolators which contains three fixed co-acting contacts.

The principal object of the present invention is to provide a more simple and less expensive construction for a capacitive type of voltage-divider arrangement for ascertaining the position of the contacts of an isolating switch component of a metal-clad, pressure gas-insulated switchgear installation. This objective is attained by providing a voltage measuring electrode near and insulated from the casing which encloses the isolatable parts and associated contacts of the isolating switch, this electrode being disposed opposite the switchgear part to be earthed and being connected electrically to the measuring terminal of a voltage divider established in part by the electrode. The measuring electrode which has an annular configuration surrounds, but does not make contact with, an earthed movable contact member of an earthing switch mounted on the earthed casing enclosing the isolatable parts and the isolating switch, this movable contact member being adapted to be moved into engagement with the switchgear part to be earthed following separation from the other switchgear part by disengaging the contacts of the isolating switch.

The foregoing as well as other objects and advantages inherent in the invention will become more apparent from the following detailed description of a preferred embodiment thereof and as illustrated in the accompanying drawings, wherein FIG. 1 is a view in longitudinal central section of the enclosed isolatable switchgear parts and the associated isolating switch structure together with the associated earthing switch and measuring electrode for the capacitive voltage divider and FIG. 2 is a schematic electrical diagram showing the various effective natural capacitances and their relationship to each other and to the isolating switch and the measuring instrument which indicates whether the switch contacts are engaged or disengaged.

With reference now to the drawing, wherein essentially only the encased isolating switch component of the metal-clad, pressure gas-insulated electrical switchgear apparatus has been illustrated in order to simplify the disclosure, an earthed metallic electrically conductive casing 1 which is filled with a pressurized insulating gas encloses line parts 2 and 3 supported centrally within the casing by insulators 4, the line parts 2 and 3 being isolatable from each other by means of an isolating switch structure which includes a cylindrical movable contact member 5 mounted for sliding movement within a recess provided in the end of the rigid stationary line part 2, the contact member 5 having an actuating rod 5a connected thereto and which passes through a longitudinal bore provided centrally with the line part 2. The drive for the actuating rod 5a can be of any suitable type already known in the art and hence has not been illustrated. To facilitate current flow from the line part 2 to the cylindrical movable contact member 5, the latter passes through and makes contact with an annular contact member 5b which is supported within the line part 2 near the end thereof.

As illustrated, the movable contact member 5 is in its "off" position wherein it is seen that the rounded end of the contact member is adjacent the rounded off end of the line part 2.

The other contact member 6 of the isolating switch has an annular configuration and is supported in a recess provided in the end of the other rigid line part 3. The line part 3 is also seen to be provided with a second contact member 8 having an annular configuration located within another recess established along the side of the line part 3 orthogonally to contact member 6. Contact member 8 is adapted to be engaged by a cylindrically formed movable contact member 9 of an earthing switch which is mounted within a metallic electrically conductive housing 10 supported by casing 1 and extending laterally therefrom. Housing 10 includes an end flange 10a secured to a flange portion 1a at the end of a tubular outlet 1b from casing 1 which also electrically interconnects them, and the movable contact member 9 is hand actuatable by a drive mechanism, not detailed, but which includes a drive link 9a, that serves to move the contact member 9 from a retracted position, i.e., the position illustrated in the drawing, to an advanced position into the casing 1 where it engages and thus earths the line part 3 to its earthed casing 1 via 8, 9, annular contact 9b, 10, 10a and 1a.

An annular measuring electrode 11 is located within the tubular outlet 1b and is mounted on the adjacent end of the earthing switch housing 10 with an insulating disc 12 interposed therebetween so that electrode 11 is electrically insulated from both the housing 10 and casing 1. Electrode 11 is electrically connected by a lead 13 to a measuring terminal 14, the lead 13 being taken out of the casing 1 through an insulator lead-through 15 at flange 10a.

A portable type of voltmeter 16 with a high resistance input is connectible to the measuring connection 14.

When it is desired to isolate line part 3 from line part 2 and then earth the isolated line part 3, the movable contact member 5 of the isolator switch is moved from a position engaging its associated stationary contact member 6 to the position indicated in the drawing. The earthing switch is then actuated from the position shown in the drawing to a position wherein the contact member 9 of the earthing switch after passing through the opening within the annular electrode 11 engages the stationary contact member 8 on line part 3 thereby to earth the latter to the earthed casing 1.

It is thus seen that by means of the insulated arrangement of the measuring electrode 11, a capacitive voltage divider is formed, the partial capacities of which are formed on the one hand by the natural capacities between the switchgear parts 2, 3 and the measuring electrode 11, and on the other hand by the capacities between electrode 11 and the earthed casing 1.

These various effective natural capacitances $C_1$ to $C_5$ are depicted in FIG. 1. FIG. 2 shows the relationship between these natural capacitances and their relationship to the isolating switch and the measuring instrument 16 which is used to indicate whether the contacts of the isolating switch are engaged or disengaged. Capacitance $C_4$ is seen to be connected across contacts 5 and 6 of the isolator switch and in series with capacitance $C_5$ to the earthed casing 1. One terminal of each of the capacitances $C_1$, $C_2$ and $C_3$ is common to the measuring electrode 11 and the indicating instrument, voltmeter 16, is connected between electrode 11 and the earthed casing 1 and also across capacitance $C_1$.

When contact member 5 is engaged with contact member 6 thus to electrically interconnect the line parts 2 and 3, the voltmeter 16 connected to measuring terminal 14 will indicate a high voltage since capacitance $C_4$ is inoperative. Conversely, when contact member 5 is disengaged from contact member 6, thus to isolate line part 3 from line part 2, the voltmeter will indicate a very low voltage since capacitance $C_4$ is operative. The voltage value may also be used to check the voltmeter if it does not have its own test circuit. The measuring terminal 14 may also be arranged to be electrically connected to the earthed casing 1 when the voltmeter is not connected.

We claim:

1. High-voltage metal-clad gas-insulated switchgear apparatus comprising a gas-filled earthed casing enclosing two rigid conductor parts arranged with the ends thereof in confronting spaced relation, an isolator switch including separable contact means connected respectively to said conductor parts for selectively electrically interconnecting said conductor parts or electrically isolating one such part from the other, an earthing switch mounted on said casing, said earthing switch including a movable contact member electrically connected to said earthed casing and which is actuatable into engagement with that conductor part which is isolatable by operation of said isolator switch thus to electrically connect the isolated conductor part to said earthed casing, and a capacitive voltage divider for deriving a voltage indicative of the position of said contact means of said isolator switch, said voltage divider including a measuring electrode mounted within said casing and electrically insulated therefrom, said electrode being disposed opposite said isolatable conductor part to be earthed and also spaced therefrom to establish one capacitor of said voltage divider and being electrically connected to a measuring terminal of said voltage divider, the other capacitors of said divider being constituted by the capacities existing respectively between said measuring electrode and said casing, between said measuring electrode and each of said rigid conductor parts and between the separable contact means of said isolator switch.

2. Switchgear apparatus as defined in claim 1 wherein a voltmeter having a high resistance input characteristic is connectible to said measuring terminal of said voltage divider.

3. Switchgear apparatus as defined in claim 1 wherein said contact means of said isolator switch comprises a movable contact member mounted in the end of one of said rigid conductor parts and a first annular contact member mounted in the end of the other said conductor part, and wherein said movable contact member of said earthing switch is engageable with a second annular contact member mounted on said isolatable conductor part orthogonally to said first annular contact member.

4. Switchgear apparatus as defined in claim 3 wherein said voltage measuring electrode has an annular configuration and surrounds said movable contact member of said earthing switch which is movable through said electrode from a retracted position adopted for a closed position of said isolator switch to an advanced position adopted for an open position of said isolator switch thereby to engage and thus earth said isolatable conductor part.

5. Switchgear apparatus as defined in claim 1 wherein said earthed casing includes a laterally directed tubular outlet located opposite to said isolatable conductor part and on which said earthing switch is mounted, and wherein said voltage measuring electrode has an annular configuration and is mounted at said tubular outlet, said annular voltage measuring electrode surrounding said movable contact member of said earthing switch and said movable contact member being movable through said annular electrode from a retracted position adopted for a closed position of said isolator switch to an advanced position adopted for an open position of said isolator switch thereby to engage and thus earth said isolatable conductor part.

* * * * *

UNITED STATES PATENT OFFICE
CERTIFICATE OF CORRECTION

Patent No. 3,806,682　　　　　　　　　Dated April 23, 1974

Inventor(s)　　　Gerhard Mauthe and Walter Stolarz

It is certified that error appears in the above-identified patent and that said Letters Patent are hereby corrected as shown below:

[30] Foreign Application Data

October 22, 1971 - Swiss application
No. 15380/71

Signed and sealed this 5th day of November 1974.

(SEAL)
Attest:

McCOY M. GIBSON JR.
Attesting Officer

C. MARSHALL DANN
Commissioner of Patents